United States Patent
Olcott et al.

(10) Patent No.: US 10,599,293 B1
(45) Date of Patent: Mar. 24, 2020

(54) CONTEXTUAL INTERFACE FOR ITEM SELECTION

(71) Applicant: Amazon Technologies, Inc., Seattle, WA (US)

(72) Inventors: Andrew Olcott, Seattle, WA (US); Julia Hannah Blum, Seattle, WA (US); Wesley Scott Lauka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 15/619,014

(22) Filed: Jun. 9, 2017

(51) Int. Cl.
*G06F 3/0482* (2013.01)
*G06Q 30/06* (2012.01)
*G06F 9/451* (2018.01)
*G06F 3/0488* (2013.01)

(52) U.S. Cl.
CPC ........ *G06F 3/0482* (2013.01); *G06F 3/04883* (2013.01); *G06F 9/453* (2018.02); *G06Q 30/0633* (2013.01); *G06Q 30/0639* (2013.01); *G06Q 30/0641* (2013.01); *G06Q 30/0643* (2013.01)

(58) Field of Classification Search
CPC ........... G06Q 30/0639; G06Q 30/0641; G06Q 30/0643; G06Q 30/0633; G06F 9/453; G06F 3/0482; G06F 3/04883
See application file for complete search history.

(56) References Cited

U.S. PATENT DOCUMENTS

| | | | |
|---|---|---|---|
| 10,055,779 B1* | 8/2018 | Varma | G06Q 30/0633 |
| 2006/0167811 A1* | 7/2006 | Bhambri | G06Q 30/02 705/59 |
| 2015/0302482 A1* | 10/2015 | Vagner | G06Q 30/0269 705/14.66 |
| 2016/0019628 A1* | 1/2016 | Udumudi | G06Q 30/0633 705/26.8 |
| 2016/0189276 A1* | 6/2016 | Batra | G06Q 30/0633 705/26.8 |
| 2016/0210674 A1* | 7/2016 | Allen | G06Q 30/0605 |
| 2017/0256001 A1* | 9/2017 | Isaacson | G07G 1/0009 |

* cited by examiner

*Primary Examiner* — Chau T Nguyen
(74) *Attorney, Agent, or Firm* — Knobbe Martens Olson & Bear LLP

(57) ABSTRACT

Systems and methods are described for generating, displaying, and navigating contextual user interfaces. A contextual user interface is associated with a particular context, such as a particular provider of items. A contextual user interface generation service may generate a contextual user interface for a particular provider, or may generate a contextual user interface for an aggregate context that includes multiple providers. A user interface element may be provided for navigating from one context to another, and a contextual user interface may be displayed or updated as the selected context changes. The contextual user interface may display context-specific information, such as provider-specific items, criteria, or other information, and may automatically change the displayed context as context-specific items are selected.

6 Claims, 8 Drawing Sheets

CONTEXTUAL INTERFACE FOR ITEM SELECTION

BACKGROUND

Generally described, computing devices and communication networks can be utilized to exchange information. In a common application, a computing device can request information from another computing device or devices via a communication network. For example, a user of a personal computing device can utilize a software application process, typically referred to as an "app" or a "browser," to request information via the Internet regarding goods or services that are offered by third parties and made available through a server computing device or devices. In such embodiments, the personal computing device can be referred to as a client computing device or a mobile computing device.

Mobile computing devices may therefore obtain and provide relevant information regarding goods or services (collectively and individually referred to as "items") that are made available by multiple third parties, either by obtaining information from various third-party site or by obtaining information from a centralized server (referred to as a "network site") that aggregates third-party information. The third parties, in turn, may have various conditions and requirements with regard to making their items available.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
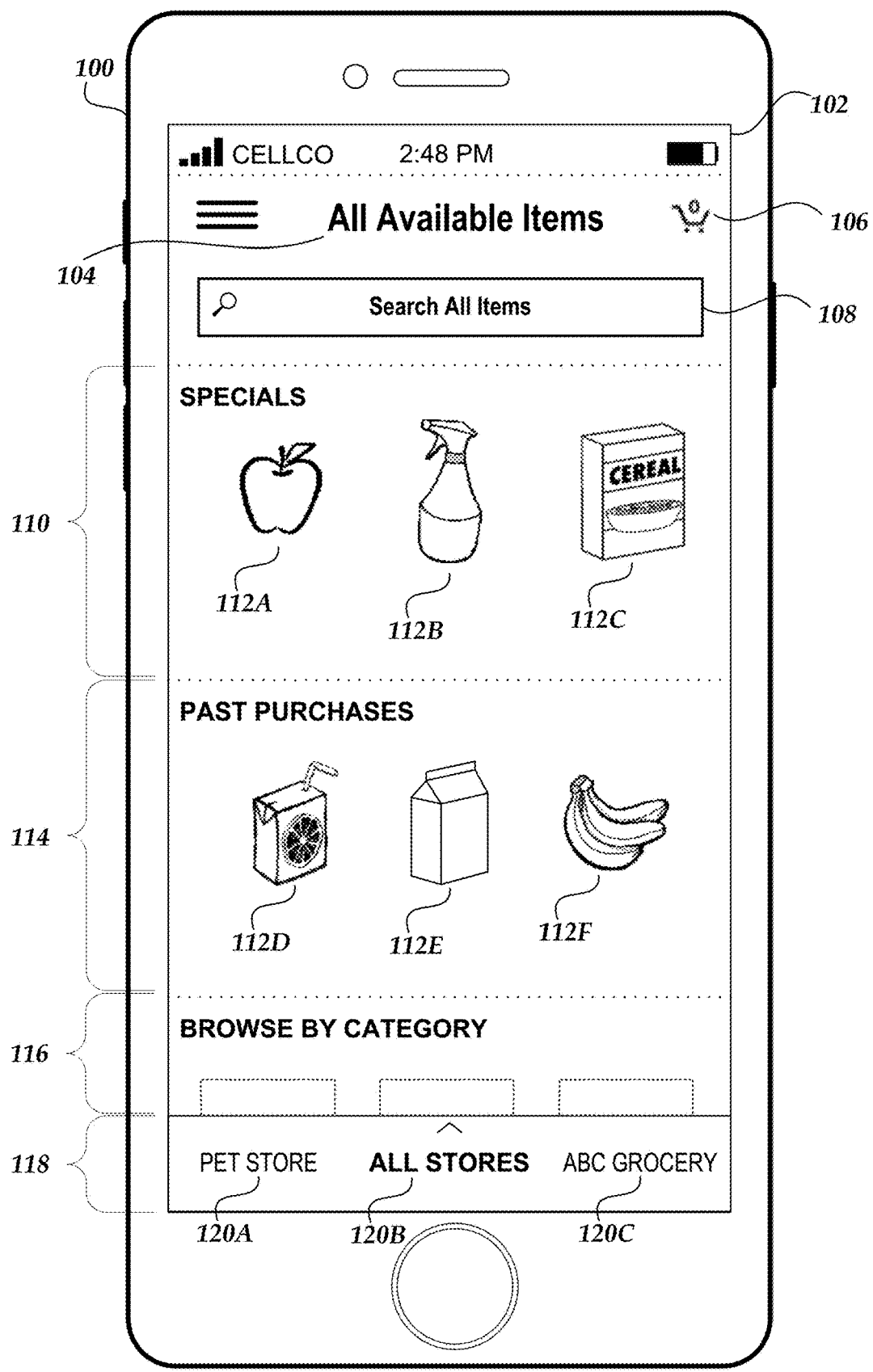
FIGS. 1A-1E are pictorial diagrams depicting illustrative user interfaces for selecting and displaying a user interface context in accordance with aspects of the present disclosure.

Generally described, aspects of the present disclosure are directed to systems, methods, and computer-readable media related to generating, selecting, and displaying contextual user interfaces, and thereby providing a technical solution to a problem specifically arising in the realm of computer networks. A contextual user interface, as used herein, may be generally described as a user interface associated with a particular provider or providers of items. A contextual user interface, in some aspects, may enable interaction with the items provided by the particular provider(s), and may provide context-specific information.

Illustratively, an operator of a network site may provide user interfaces that enable users to interact with items from multiple providers. The items may be, for example, goods, services, and/or information that providers make available for acquisition through the network site. Some individual items may be available from multiple providers, or various providers may make similar or complementary items available. The network site may therefore provide interfaces that enable browsing and selecting items made available by a number of providers.

Individual providers may make items available under provider-specific conditions. For example, a provider may specify a minimum order requirement or a delivery window for the items available from that provider. When selecting items through interfaces that enable interaction with items from multiple providers, users may thus select items from a variety of providers without meeting the conditions of any particular provider, and may therefore be unable to complete an order or may abandon an order due to not meeting the conditions. For example, a user may seek to acquire items from two providers that both have a minimum order threshold. The total amount of items sought may exceed the threshold of either provider, but because the user seeks to acquire some items from one provider and some from the other, the per-provider thresholds are not met and the order cannot be placed.

To overcome these difficulties, an operator of a network site may implement a service for generating contextual user interfaces. A contextual user interface may, in some embodiments, be associated with a particular provider. The contextual user interface may thus highlight provider-specific order criteria, indicate the user's progress toward meeting the provider-specific criteria, and display items that will count toward meeting the criteria (e.g., items associated with the provider) if selected by the user. For example, a contextual user interface for a particular provider may indicate that the provider has a minimum order requirement, a particular delivery window, or other criteria. A contextual user interface service may therefore display contextual user interfaces that include various items associated with a context and various indicators associated with context-specific criteria.

It will be understood that the contextual user interface generation service described herein improves the performance of a computer at the task of identifying items of interest in a collection that may include thousands or millions of items, allowing the computer to efficiently identify and present relevant items while reducing the amount of computing resources (e.g., memory, processing power, bandwidth, etc.) required to perform this task. It will further be understood that the contextual user interface generation service described herein addresses a technical problem that specifically arises in the realm of computer networks, where a user may instantaneously and seamlessly transition from one virtual storefront to another without necessarily realizing they have done so. For example, in the pre-Internet world, a user did not require a consistently displayed contextual aid to inform the user of the physical establishment in which he or she was currently located, nor did the possibility arise of the pre-Internet user being in multiple physical establishments at once. By displaying a contextual user interface element that has a consistent relationship with the currently displayed context—including identifying the currently displayed context, providing information regarding the context, and enabling and informing the user of transitions from one context to another—the contextual user interface generation service resolves these technology-specific problems.

A "context," as used herein, may refer to one or more providers of items, the items associated with the provider(s), criteria or information associated with the provider(s), or combinations thereof. For example, a context may be associated with a particular provider of items, such as a particular store, restaurant, provider of hosted computing services, or other provider. As further examples, a context may be associated with a group or category of providers, a set of affiliated providers, or a location or region. In some embodiments, a context may aggregate other contexts, such that items associated with an individual provider context are also associated with an aggregate context that includes the provider. It will thus be understood that various contexts may include or exclude items, criteria, or other information depending on whether the context is associated with a particular provider or providers.

As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

The foregoing aspects and many of the attendant advantages will become more readily appreciated as the same become better understood by reference to the following detailed description, when taken in conjunction with the accompanying drawings.

FIG. 1A is a pictorial diagram of an illustrative mobile computing device 100, which displays an illustrative contextual user interface 102 in accordance with aspects of the present disclosure. The mobile computing device 100 is described in more detail with reference to FIG. 4 below. The illustrative contextual user interface 102 may include a description 104, which indicates the scope or context of what the user interface 102 displays.

The contextual user interface 102 may further include a selected items indicator 106, which indicates the number of items that the user has selected by interacting with the user interface 102. The contextual user interface 102 may further include a search control (such as a search bar) 108, which enables entry of search criteria. As described below, the search criteria may be modified according to a currently displayed or selected context, and search results may be obtained or filtered according to context.

The contextual user interface 102 may further include an item category display 110, which displays items 112A-C. Illustratively, the item category display 110 may correspond to particular criteria, and the items 112A-C may be items that satisfy the criteria. For example, the item category display 110 may correspond to items that are discounted by the provider, items that are newly made available by the provider, items that are exclusive to the provider, items in a particular item category (e.g., produce, sporting goods, music, home electronics, etc.), items that were previously purchased or favorited by the user, and the like. The user interface 102 may further include a second item category display 114, which similarly displays items 112D-F. The individual items 112A-F may be particular items that are made available by the provider. In some embodiments, selecting a particular item 112A-F may display an item detail page, add the item to a list of selected items, or perform other interactions with the item 112A-F. The contextual user interface 102 may further include browsing controls 116, which enable browsing particular categories of items.

The contextual user interface 102 further includes a context selector 118, which enables selection of context 120A, context 120B, or context 120C. It will be understood that "context" may be used herein to refer to both a context and a user interface control (or portion of a user interface control) that enables selection of the context. In the illustrated embodiment, the "all stores" context 120B is selected and corresponds to the displayed contextual user interface 102. As described and illustrated below, the context selector 118 may enable selection of further contexts through user interaction. For example, a touch gesture (e.g., a swipe to the left or right) may cause the context selector 118 to display additional contexts, which may then be selected by another touch gesture (e.g., a tap or long press).

It will be understood that the contextual user interface 102 is provided for purposes of example, and that various interfaces containing more, fewer, or different elements are within the scope of the present disclosure. For example, any or all of the user interface elements 104-116 may be omitted, combined, separated, reordered, or repositioned relative to each other or the context selector 118. The contextual user interface 102 is thus understood to be illustrative and not limiting.

Figure 1B:
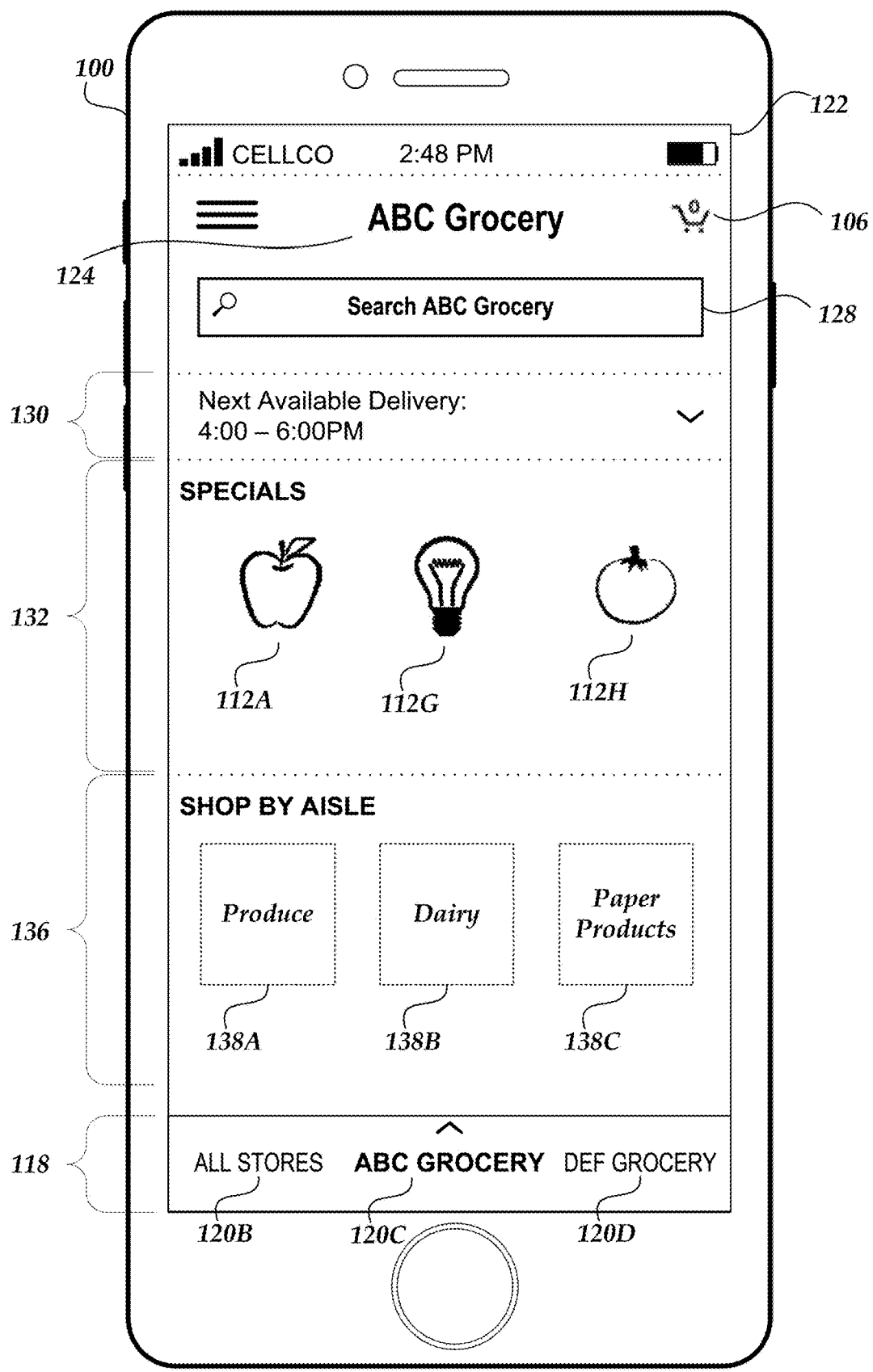

FIG. 1B is a pictorial diagram of the mobile computing device 100 displaying a second illustrative contextual user interface 122 in accordance with aspects of the present disclosure. The contextual user interface 122 is associated with the "ABC Grocery" context 120C, as indicated by the context selector 118 and other user interface elements. For example, the contextual user interface 122 may include a description 124 that is specific to the context 120C, a search control 128 that may be used to obtain search results for the context 120C, and so forth. In the illustrated embodiment, the context 120C is associated with a particular provider of items (a grocery store named "ABC Grocery"). In other embodiments, the context 120C may correspond to a group of providers, a category of providers, a location or region, all available providers, or various other contexts. For example, the context 120C may be restaurants, pharmacies, grocery stores, stores at a particular shopping mall, providers of a particular type or category of product (e.g., pet supplies), and so forth.

The contextual user interface 122 may contain a selected items indicator 106, as also depicted in FIG. 1A. In some embodiments, the contextual user interface 122 may instead include a context-specific indicator, and/or the appearance of the selected items indicator 106 may be modified to indicate whether items associated with the currently displayed context 120C have been selected by the user.

The contextual user interface 122 may further include context-specific information such as delivery information 130. Illustratively, the delivery information 130 may indicate the next available delivery time for items from "ABC Grocery." In various embodiments, the contextual user interface 122 may include other information associated with the displayed context 120C, such as a store location, hours of operation, and so forth.

The contextual user interface 122 may further include an item display 132, which may display particular items 112A, 112G, and 112H that are associated with the displayed context 120C. In some embodiments, an item displayed in the contextual user interface 122 may be displayed in another contextual user interface, such as contextual user interface 102 or the contextual user interfaces described below with reference to FIGS. 1C-1E. For example, the "apple" item 112A may be displayed in both the "ABC Grocery" context 120C and the "DEF Grocery" context 120D (as well as the "all stores" context 120B), because both providers make the item 112A available. In other embodiments, an item (e.g., the "light bulb" item 112G) may be associated with or exclusive to a particular provider, and may only be displayed in contexts associated with that provider (e.g., the "all stores" context 120B and the "ABC Grocery" context 120C). The contextual user interface 122 may further include an item category selector 136, which may enable user selection of item categories 138A-C.

The contextual user interface 122 further includes the context selector 118, which in FIG. 1B indicates that context 120C ("ABC Grocery") has been selected and is displayed. In some embodiments, as described above, the user may make a swipe gesture on the context selector 118 to change the selected context from the "all stores" context 120B to the "ABC Grocery" context 120C, and in response the mobile computing device 100 may change the displayed contextual user interface from contextual user interface 102 to contextual user interface 122.

It will be understood that the contextual user interface 122 is provided for purposes of example, and that the user interface elements described with reference to FIG. 1B may be varied without departing from the scope of the present disclosure.

Figure 1C:
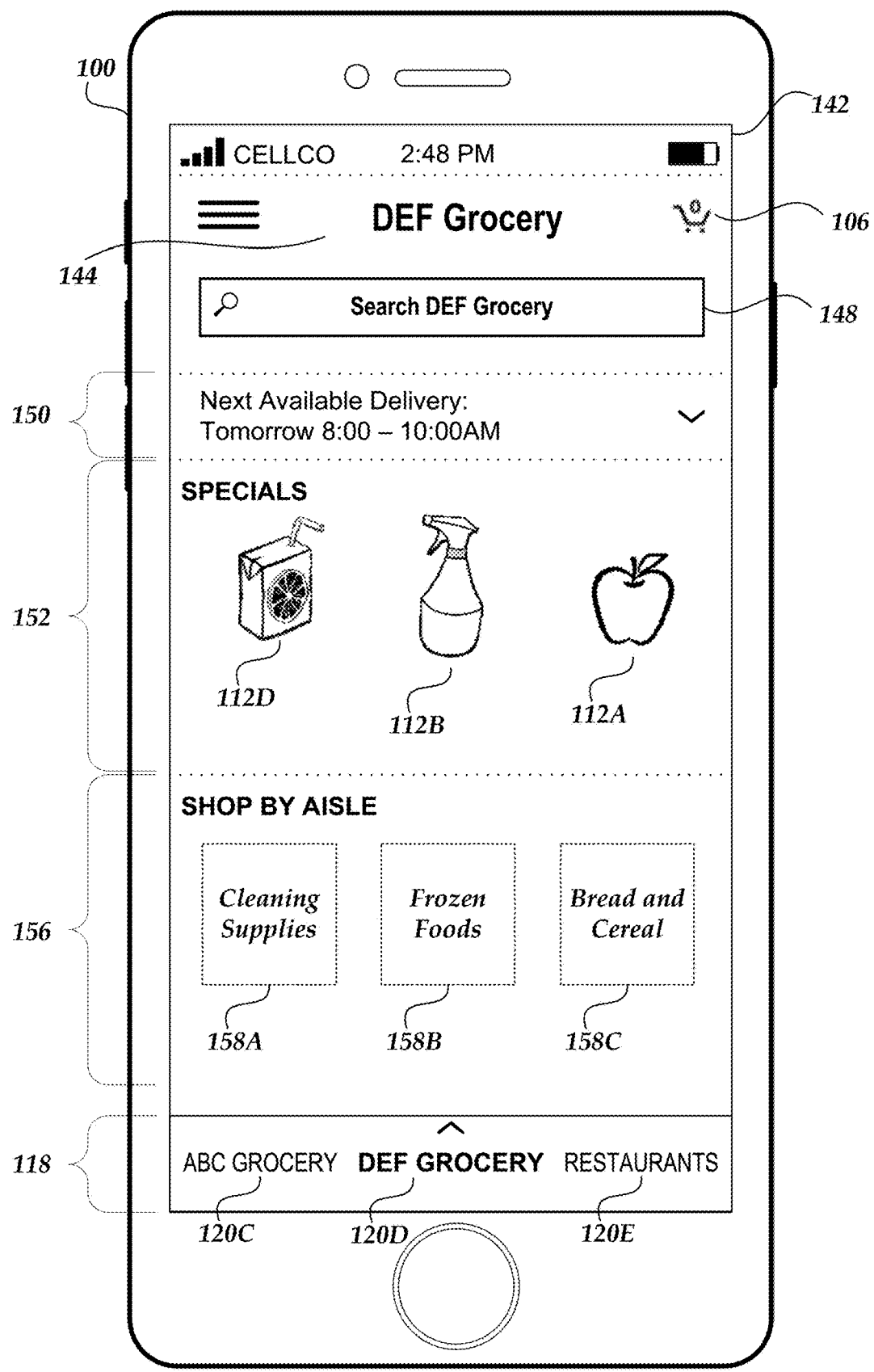

FIG. 1C is a pictorial diagram of the mobile computing device 100 displaying a third illustrative contextual user interface 142 in accordance with aspects of the present disclosure. The contextual user interface 142 is associated with the "DEF Grocery" context 120D, as indicated by the context selector 118 and other user interface elements. The contextual user interface 142 may include items that are associated with the "DEF Grocery" context 120D, such as items 112D, 112B, and 112A. Some items, such as the "apple" item 112A, may also be associated with other providers. Contextual user interfaces that are associated with those other providers, but not associated with the "DEF Grocery," may therefore include the "apple" item 112A even though those contextual user interfaces are not associated with the "DEF Grocery" provider. Other items, such as the "cleaning fluid" 112B item, may only be associated with the "DEF Grocery" provider, and thus may appear in contexts associated with the "DEF Grocery" provider and not appear in (or be excluded from) contexts that are not associated with the "DEF Grocery" provider. The other user interface elements depicted in FIG. 1C are comparable to their counterparts in FIG. 1B and provide similar functionality.

Figure 1D:
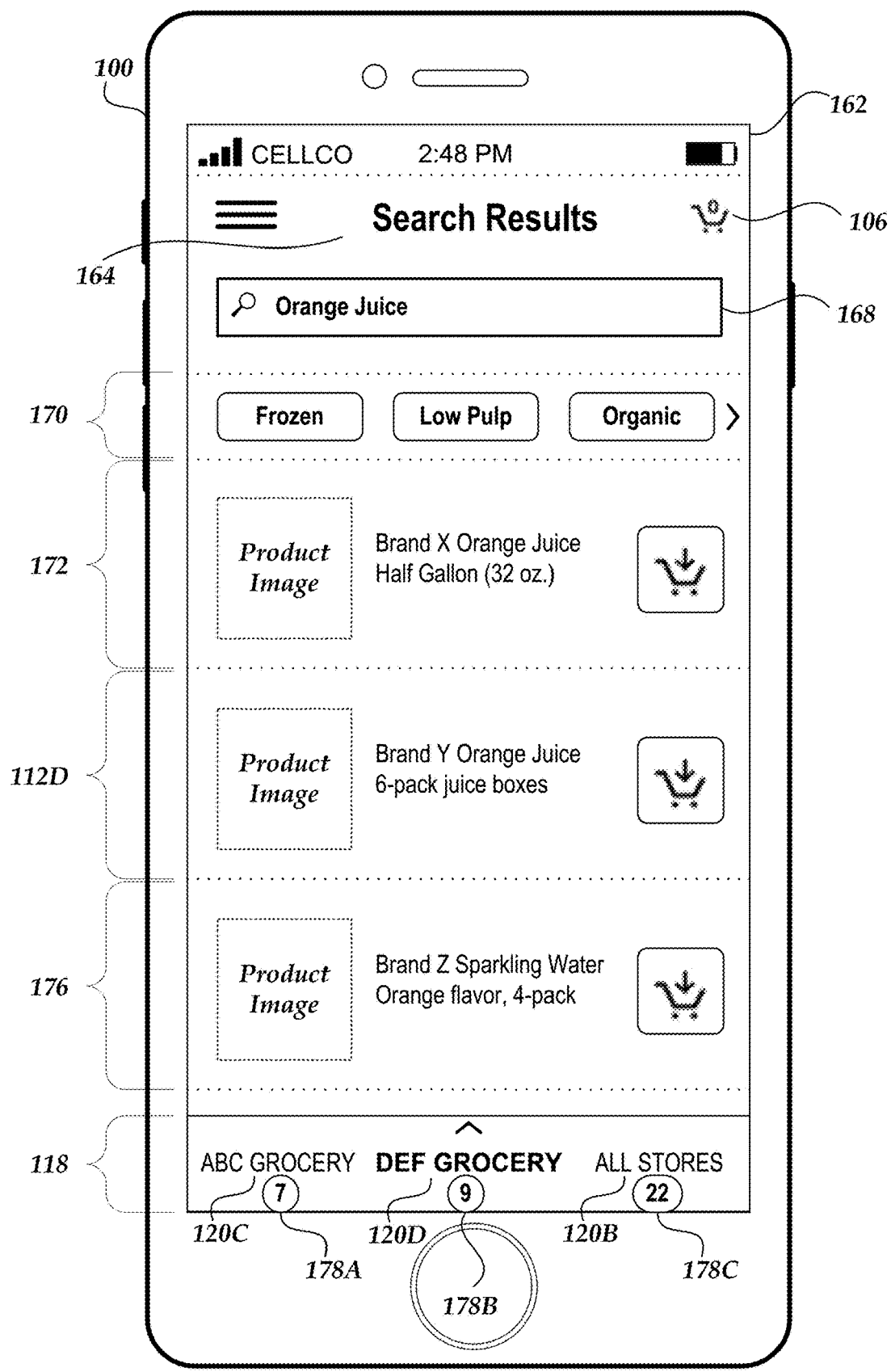

FIG. 1D is a pictorial diagram of the mobile computing device 100 displaying a fourth illustrative contextual user interface 162 in accordance with aspects of the present disclosure. The contextual user interface 162 is also associated with the "DEF Grocery" context 120D, as indicated by the context selector 118 and other user interface elements. In the illustrated contextual user interface 162, the user has entered a search term ("Orange Juice") into the search control 168, and has obtained search results 172, 112D, and 176, which correspond to items associated with the "DEF Grocery" context 120D. The contextual user interface 162 may further include an item category selector 170, which enables filtering of search results according to item categories or characteristics.

In the contextual user interface 162, the context selector 118 may display contextual search result indicators 178A-C, which indicate a number of search results found in each context. For example, the contextual search result indicators 178A-C may indicate that seven search results have been found in the "ABC Grocery" context 120C, nine search results have been found in the "DEF Grocery" context 120D, and a total of 22 search results have been found in the "All Stores" context 120E. It will be understood that search results in the "All Stores" context 120E may aggregate search results from provider-specific contexts, such as contexts 120C and 120D. It will further be understood that the nine search results found in the "DEF Grocery" context 120D may include the search results 172, 112D, and 176, and that other search results may be accessed by, e.g., scrolling the portion of the contextual user interface 162 in which the search results 172, 112D, and 176 are displayed. In some embodiments, user interaction with the context selector 118 may change which search results are displayed in the contextual user interface 162, or may cause display of a different contextual user interface. For example, swiping the context selector 118 to select the "ABC Grocery" context 120C may cause search results associated with the context 120C to be displayed, or swiping the context selector 118 to select the "All Stores" context 120B may cause search results associated with the context 120B to be displayed. In various embodiments, the contexts that are selectable via the context selector 118 may be dynamically updated, sorted, or rearranged based on search results. For example, contexts that include a higher number of search results may be sorted to be more accessible, or contexts that include no search results may be omitted.

Figure 1E:
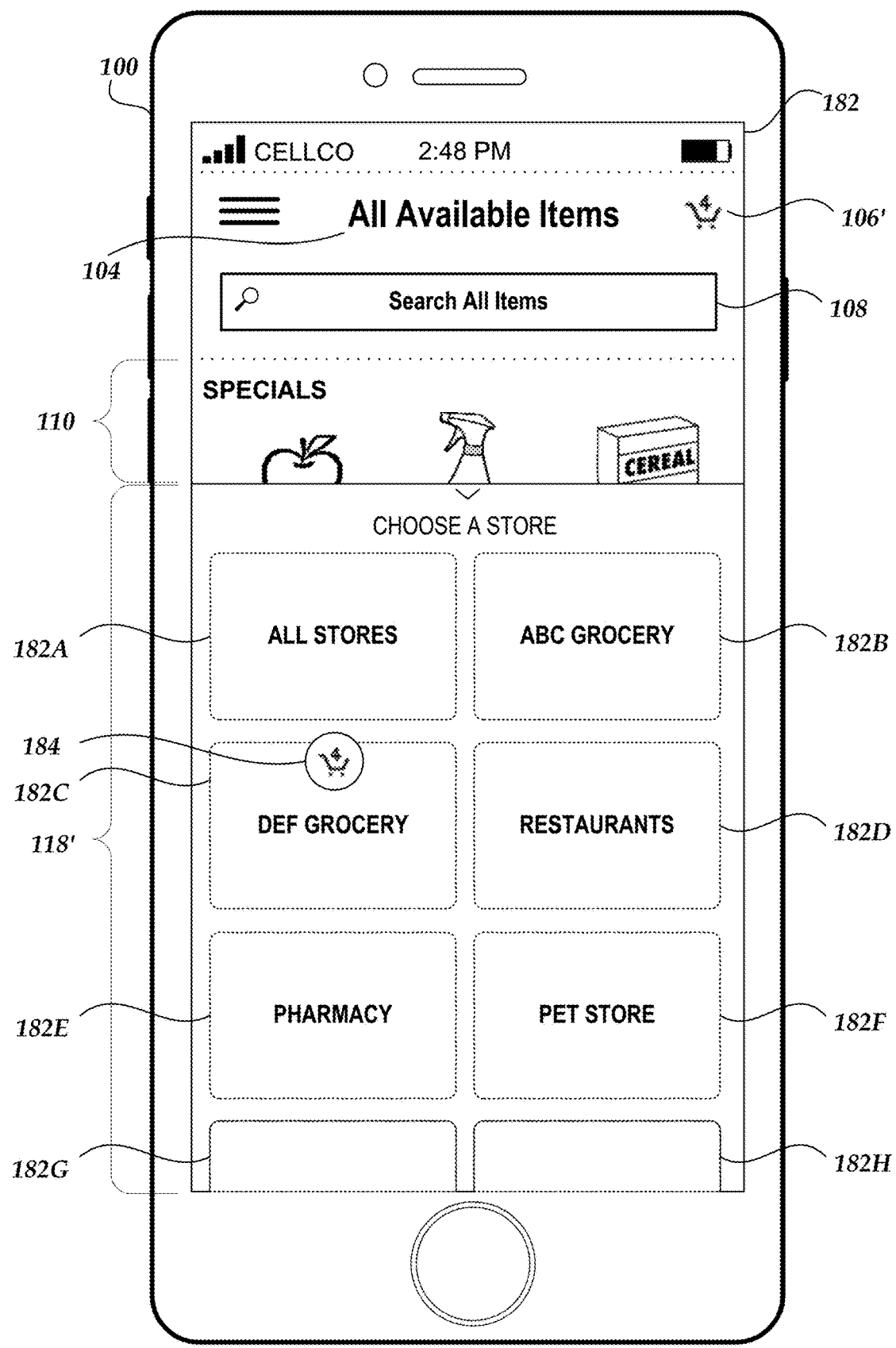

FIG. 1E is a pictorial diagram of the mobile computing device 100 displaying a fifth illustrative contextual user interface 182, in which an expanded context selector 118' covers a larger portion of the display. Illustratively, user interaction with the context selector 118 of FIG. 1A may cause the expanded context selector 118' to be displayed. For example, the user may swipe up on the context selector 118 to display the expanded context selector 118'.

As illustrated, the expanded context selector 118' includes content selection buttons 182A-H, which enable selection of various contents. For example, content selection button 182B enables selection of the "ABC Grocery" context. The content selection buttons 182A-H, in some embodiments, may display additional information regarding the associated context, such as a delivery window, hours of operation, number of search results, special offers, number of selected items, a "favorite" symbol or other indication of a user preference for the provider, and the like. For example, the content selection button 182C displays a contextual selected items indicator 184, indicating that the user has selected four items from "DEF Grocery." The contextual user interface 182 also includes a global selected items indicator 106', which also indicates that the user has selected four items.

It will be understood that the contextual user interfaces depicted in FIGS. 1A-1E are provided for purposes of example, and that various other contextual user interfaces that include more, fewer, or different elements are within the scope of the present disclosure. For example, contextual shopping cart indicators may be displayed with the content selector 118, or search result indicators may be displayed with the expanded content selector 118'. As further examples, the context selector 118 may be implemented as a vertically scrolling list, positioned at the top of the screen or above a virtual keyboard, or other implementations.

In some embodiments, a contextual user interface may automatically display the expanded context selector 118' if various criteria are met. For example, a contextual user interface may display the expanded context selector 118' if a new store has been added, if a threshold number of new stores have been added, if a user has not changed the context for a threshold time period, if a contextual user interface has not been displayed for a threshold time period, and so forth.

Figure 2:
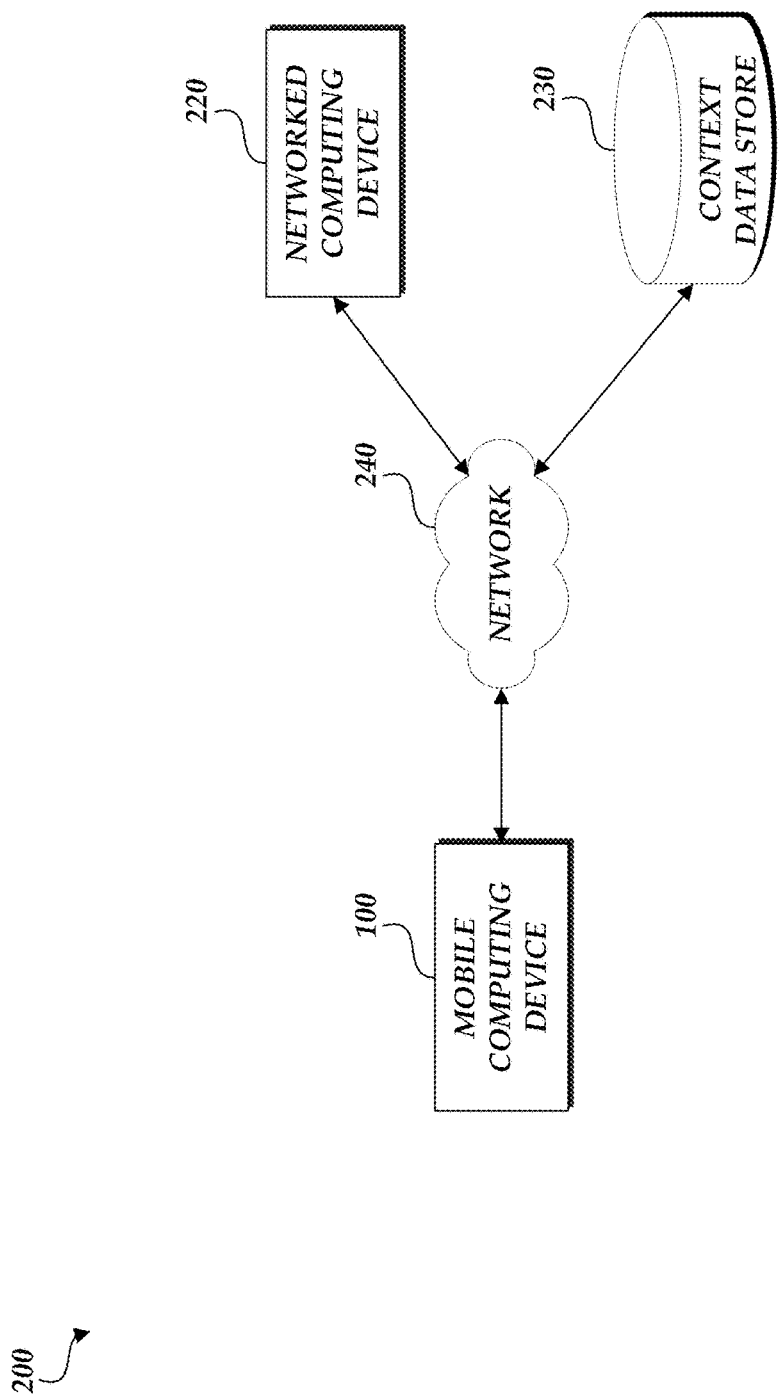
FIG. 2 is a functional block diagram depicting an illustrative network environment for implementing a contextual user interface service in accordance with aspects of the present disclosure.

FIG. 2 is a functional block diagram depicting an illustrative network environment 200 for implementing a contextual user interface service in accordance with aspects of the present disclosure. The illustrated network environment 200 depicts the mobile computing device 100, a networked computing device 220, and a context data store 230 communicating via a network 240.

The mobile computing device 100 is described in more detail with reference to FIG. 4 below. In some embodiments, the mobile computing device 100 may implement a contextual user interface service as described herein. In other embodiments, the mobile computing device 100 may communicate via the network 240 with a networked computing device 220 that implements a contextual user interface service.

The networked computing device 220 may illustratively be any computing device that implements aspects of the present disclosure, including but not limited to aspects such as providing a contextual user interface service. In some embodiments, the networked computing device 220 may implement a database server, web server, application programming interface (API), or other interface that is utilized by the mobile computing device 100 to access context data or contextual user interfaces.

The context data store 230 may illustratively be any non-transient computer-readable medium, including but not limited to hard drives, solid state devices, flash memories, EEPROMs, or other storage media. In various embodiments, the context data store 230 may be implemented as a database, a database server, a component of another server or service (e.g., the networked computing device 220), or may be combined with the mobile computing device 100 and made internal to the mobile computing device 210.

The network 240 may be any wired or wireless network, including but not limited to a local area network (LAN), wide area network (WAN), mesh network, cellular telecommunications network, the Internet, or any other public or private communications network or networks. In some embodiments, the network 240 may be omitted, and one or more of the mobile computing device 100, networked computing device 220, or context data store 230 may communicate directly with each other.

It will be understood that many of the components described in FIG. 2 are optional, and that embodiments of the present disclosure may combine or reorganize the components. Furthermore, the components need not be distinct or discrete. For example, the context data store 230 may be implemented as a component of the networked computing device 220, or the mobile computing device 100, networked computing device 220, and context data store 230 may be represented in a single physical device, or, alternately, may be split into multiple physical devices.

Figure 3:
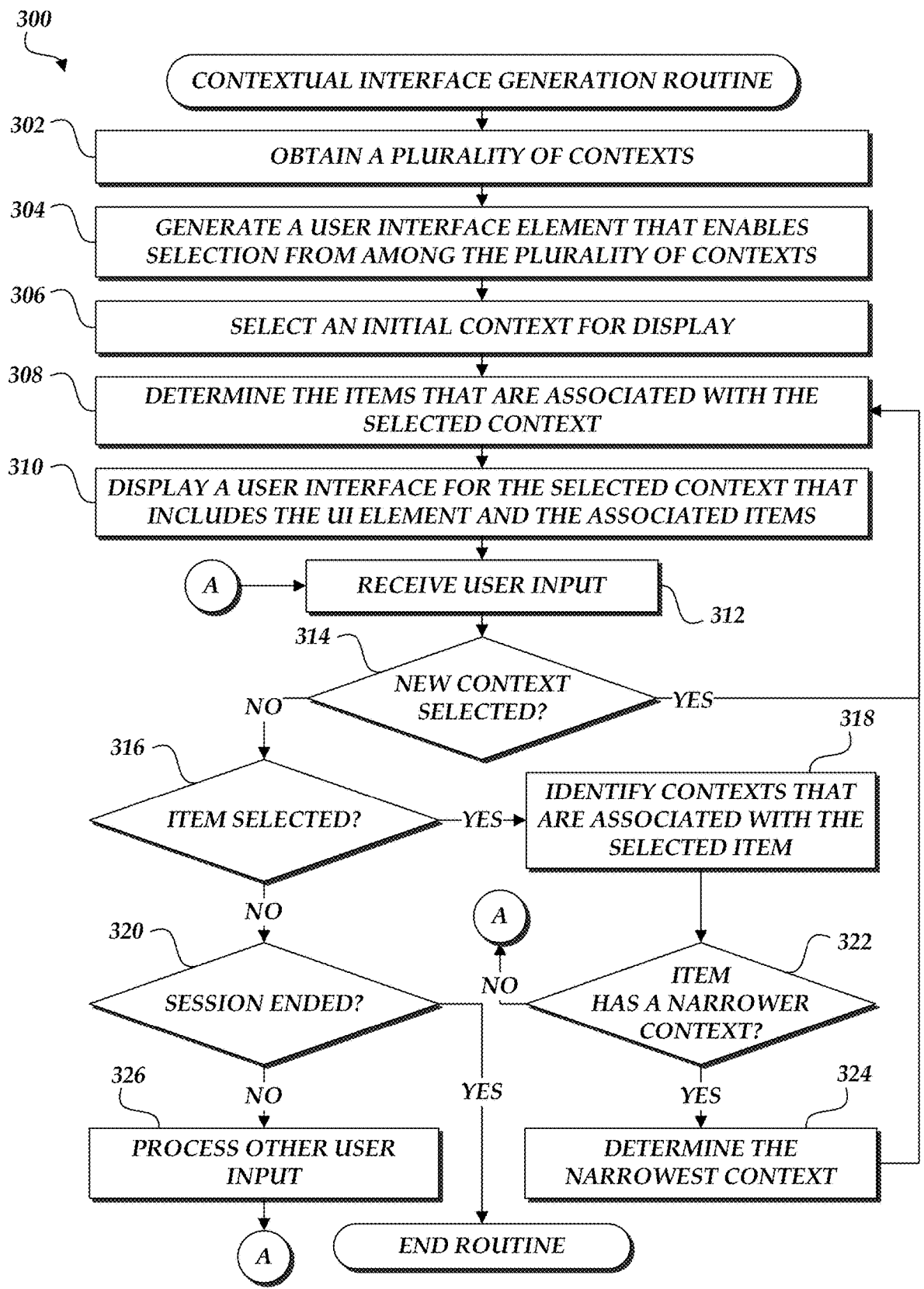
FIG. 3 is a flow diagram depicting an illustrative contextual interface generation routine that may be implemented by a contextual user interface service in accordance with aspects of the present disclosure.

FIG. 3 is a flow diagram depicting an illustrative contextual interface generation routine 300. The illustrative routine 300 may be carried out in whole or in part, for example, by the mobile computing device 100 of FIG. 2, the networked computing device 220 of FIG. 2, or both. At block 302, a plurality of contexts may be obtained. As described above, an individual context may be associated with, and may correspond to, a single provider, or in some embodiments may be associated with multiple providers. In some embodiments, additional contexts may be obtained on an as-needed or periodic basis, or only contexts that satisfy various criteria (e.g., contexts having items that satisfy a set of search criteria) may be obtained.

At block 304, a user interface element may be generated that enables selection from among the plurality of contexts obtained at block 302. Illustratively, the user interface element may be the context selector 118 or 118' of FIGS. 1A-1E. In some embodiments, the user interface element may enable selection from among a subset of the plurality of contexts. For example, the user interface may enable selection only from among those contexts that include search results for a particular item query. In further embodiments, the routine 300 may sort or prioritize the plurality of contexts. For example, the plurality may be sorted based on criteria such as frequency of usage, user preferences, search results, selected items, delivery hours, or other criteria.

At block 306, one of the contexts may be selected for initial display. For example, an aggregate context that includes all other contexts may be selected. In some embodiments, an initial context may be determined based on a most recently displayed context, a most frequently used context, a user preference for a particular context, a most recently added context, or other criteria.

At block 308, one or more items associated with the selected context may be determined. As described above, an item may be associated with a single provider or with multiple providers, and providers may in turn be associated with various contexts, such as a provider-specific context or an aggregate or category context. The items associated with the selected context may thus be determined by identifying the items associated with a provider or provider(s) that in turn are associated with the selected context. For example, the selected context may be associated with the "restaurants" category, and the determination may be that all items associated with providers in the "restaurant" category are associated with the context. As a further example, the selected context may be associated with the provider "ABC Grocery," and the determination may be that only items associated with the provider "ABC Grocery" are associated with the context.

At block 310, a user interface, which includes the user interface element generated at block 304 and the items determined at block 308, may be displayed for the selected context. In some embodiments, the user interface for the selected context may be generated as part of the routine 300, or a determination may be made as to whether the routine 300 has previously generated a user interface for the selected context (e.g., during a previous execution of block 310). In other embodiments, a contextual user interface may be obtained and displayed. Illustratively, the user interface may be one of the user interfaces depicted in FIGS. 1A-1E.

At block 312, user input may be received via the displayed user interface, and may be processed via blocks 314-326. At decision block 314, a determination may be made as to whether the user input represents a selection of a new context. For example, a new context may be selected through user input via the user interface element generated at block 304. If so, then the routine 300 branches to block 308, where items associated with the newly selected context may be determined, and at block 310 a new user interface (or, in subsequent iterations of block 310, a previously displayed user interface) may be displayed for the newly selected context.

If the user input does not represent a selection of a new context, then at decision block 316 a determination may be made as to whether the user input represents selection of an item. If a determination is then made that the user has selected an item, then at block 318 one or more contexts may be identified that are associated with the selected item. For example, as described above, a "cleaning fluid" item may be associated with a particular provider of items (e.g., "DEF Grocery"), and the contexts "DEF Grocery," "Alderwood Mall," and "All Stores" may thus be identified.

Thereafter, at decision block 322, a determination may be made as to whether a narrower context can be identified for the selected item. For example, if the current context is "All Stores" and is associated with 17 providers of items, then the determination may be that the context "Alderwood Mall," which is associated with nine providers of items, is a narrower context, or that the context "DEF Grocery," associated with one provider, is an even narrower context. If a narrower context cannot be identified for the selected item, then the routine 300 returns to block 312 and awaits further user input.

If the determination at decision block 322 is that the item can be associated with a narrower context than the currently displayed context, then at block 324 the narrowest context that is associated with the item may be determined and selected. Continuing the example above, the determination at block 324 may be that the "DEF Grocery" context is the narrowest context associated with the item. In some embodiments, the determination at block 324 may be to select a broadest context that is narrower than the current context (e.g., the "Alderwood Mall" context), or to select the broadest context that meets specified criteria. For example, a context may be determined for which the associated providers have a shared minimum order requirement, or a context may be determined that is associated with the item and is geographically closest to the user. Thereafter, the routine 300 returns to block 308, determines items to associate with the newly selected context, and iterates through the display and selection of other items and contexts.

In some embodiments, the routine 300 may determine that the currently selected context cannot be narrowed further. For example, the selected context may be associated with a single provider of items, and the items displayed for selection may thus be associated with only the currently selected context and broader contexts. In such embodiments, decision block 316 may be omitted, or may be carried out only when the selected context is one that can be narrowed.

In some embodiments, as described above, an item may be provided by more than one provider, and may thus be associated with more than one non-aggregate context. In such embodiments, the routine 300 may prompt the user to select one of the contexts associated with the selected item, or may continue to display the aggregate context until a different and more context-specific item is selected.

If the determination at decision block 316 is that an item has not been selected, then at decision block 320 a determination may be made as to whether the user input represents ending the current session (e.g., closing the user interface). If so, then the routine ends. If not, then at block 326 other user input may be processed, and the routine 300 returns to block 312 to await and receive further input.

In various embodiments, the blocks of routine 300 may be combined, omitted, or carried out in various orders. For example, decision blocks 314, 316, and 320 may be carried out in any order, or in parallel. As a further example, blocks 304 and 306 may be carried out in either order or in parallel. Still further, in some embodiments, blocks 304 and 308 may be combined and the user interface element may be generated in conjunction with displaying the user interface for the selected context. The routine 300 is thus understood to be illustrative and not limiting.

In some embodiments, the routine 300 may generate and display the user interfaces 102, 122, 142, 162, and 182 as illustrated in FIGS. 1A-1E, and may transition from one of these user interfaces to another as the routine 300 is carried out. For example, at block 306 the "All Stores" context may be initially selected for display, and at block 308 a determination may be made that the items 112A-F are associated with the "All Stores" context. The user interface 102 may then be displayed at block 310. User input may then be received at block 314, and a determination may be made at decision block 316 that the user input represents a selection of the "orange juice box" item 112D. The routine 300 may then, at block 318, identify contexts that are associated with the "orange juice box" item 112D, including the "DEF Grocery" context. At decision block 322, the routine 300 may determine that the "orange juice box" item 112D is associated with contexts (e.g., the "DEF Grocery" context) that are narrower than the "All Stores" context, and accordingly the "DEF Grocery" context may be determined at block 324 as the narrowest context associated with the item 112D. The routine 300 may then branch to block 308, where items associated with the "DEF Grocery" context may be determined, and at block 310 the user interface 142 may be displayed, and may include only items associated with the "DEF Grocery" context. The routine 300 may thus enable selection of further items associated with the "DEF Grocery" context, and may thus efficiently identify and present relevant items associated with the specific context in which the user has begun selecting items.

Figure 4:
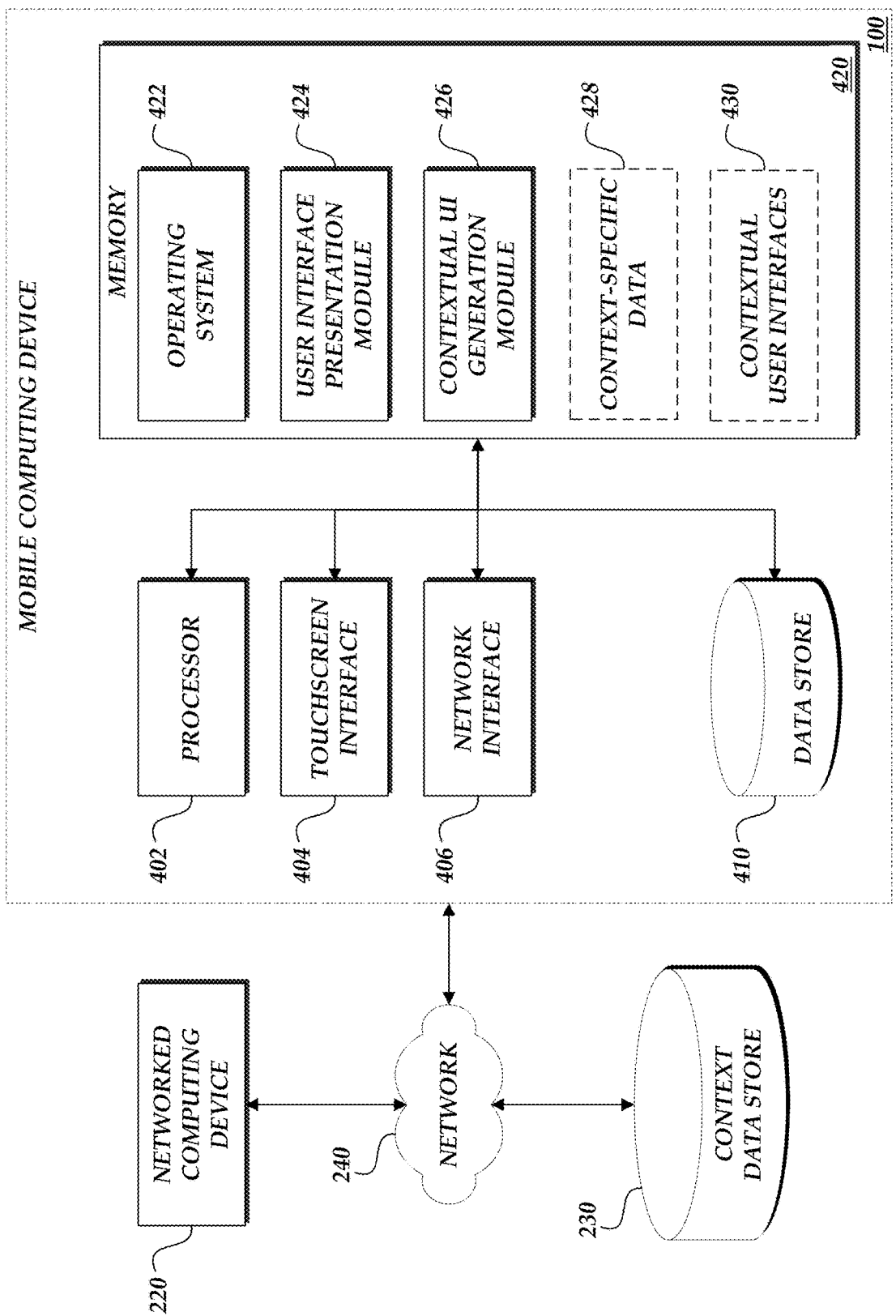
FIG. 4 is a block diagram depicting a general architecture of an example mobile computing device for implementing aspects of the present disclosure.

FIG. 4 depicts a network topology including the networked computing device 220, the context data store 230, the network 240, and a general architecture of the mobile computing device 100, which includes an arrangement of computer hardware and software components that may be used to implement aspects of the present disclosure. The network topology and the mobile computing device 100 may include many more (or fewer) elements than those shown in FIG. 4. It is not necessary, however, that all of these elements be shown in order to provide an enabling disclosure.

As illustrated, the mobile computing device 100 includes a processor 402, a touchscreen interface 404, a network interface 406, and a data store 410, all of which may communicate with one another by way of a communication bus. The network interface 406 may provide connectivity to one or more networks (such as network 240) or computing systems and, as a result, may enable the mobile computing device 100 to receive and send information and instructions from and to other computing systems or services, such as the networked computing device 220. In some embodiments, the networked computing device 220 may be configured to process requests from the mobile computing device 100, such as requests to provide item information or a contextual user interface, as described above.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the mobile computing device 100. The memory 420 may further store specific computer-executable instructions and other information (which may be referred to herein as "modules") for implementing aspects of the present disclosure. For example, the memory 420 may include a user interface presentation module 424, which may perform various operations with regard to displaying the user interfaces described herein. For example, the user interface presentation module 424 may manage the display of contextual user interfaces and manage the processing of user input via these interfaces.

In some embodiments, the memory 420 may include a contextual user interface generation module 426, which may be executed by the processor 402 to perform various operations, such as those operations described with reference to FIG. 3. The memory 420 may further include context-specific data 428 and contextual user interfaces 430, which may be loaded into the memory 420 as various operations are performed. In some embodiments, the context-specific data 428 and contextual user interfaces 430 may be obtained from the networked computing device 220 via the network 240. In other embodiments, the context-specific data 428 may be obtained from the data store 410, or the contextual user interfaces 430 may be generated by the contextual user interface generation module 426.

While the operating system 422, the user interface presentation module 424, and the contextual user interface generation module 426 are illustrated as distinct modules in the memory 420, in some embodiments, the user interface presentation module 424 and the contextual user interface generation module 426 may be incorporated as modules in the operating system 422 or another application or module, and as such, separate modules may not be required to implement some embodiments. In some embodiments, the user interface presentation module 424 and the contextual user interface generation module 426 may be implemented as parts of a single application.

It will be recognized that many of the components described in FIG. 4 are optional and that embodiments of the mobile computing device 100 may or may not combine components. Furthermore, components need not be distinct or discrete. Components may also be reorganized. For example, the mobile computing device 100 may be represented in a single physical device or, alternatively, may be split into multiple physical devices. In some embodiments, components illustrated as part of the mobile computing device 100 (such as the touchscreen interface 504) may additionally or alternatively be included in other computing devices, such that some aspects of the present disclosure may be performed by the mobile computing device 100 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts, events or functions can be performed concurrently, e.g., through multi-threaded processing, interrupt processing, or through multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
 a data store configured to store computer-executable instructions;
 a touchscreen; and
 a processor in communication with the data store and the touchscreen, wherein the computer-executable instructions, when executed by the processor, configure the processor to:
  obtain data regarding a first provider associated with a first plurality of items;
  obtain data regarding a second provider associated with a second plurality of items;
  generate for display a user interface element, the user interface element enabling selection from a plurality of contexts, wherein a first context of the plurality of contexts corresponds to the first provider and the second provider, and wherein a second context of the plurality of contexts corresponds to the first provider only;
  determine a first set of items that are associated with the first context;
  generate for display a first user interface that corresponds to the first context, the first user interface comprising the user interface element and the first set of items;
  cause display of the first user interface on the touchscreen;
  receive, via the touchscreen, a first interaction with the user interface element, the first interaction indicating selection of the second context;
  in response to receiving the first interaction:
   determine a second set of items that are associated with the second context;
   generate for display a second user interface that corresponds to the second context, the second user interface comprising the user interface element, the first plurality of items, and not the second plurality of items; and
   cause display of the second user interface.

2. The system of claim 1, wherein a third context of the plurality of contexts corresponds to the second provider only.

3. The system of claim 2, wherein the processor is further configured to:
 receive, via the touchscreen, a second interaction with the user interface element, the second interaction indicating selection of the third context;
 in response to receiving the second interaction:
  determine a third set of items that are associated with the third context;
  generate for display a third user interface that corresponds to the third context, the third user interface comprising the user interface element, the second plurality of items, and not the first plurality of items; and
  cause display of the third user interface.

4. The system of claim 1, wherein the user interface element comprises a scrollable list of the plurality of contexts.

5. The system of claim 1, wherein the first set of items associated with the first context includes at least a first item associated with the first provider and a second item associated with the second provider.

6. The system of claim 5, wherein the second set of items includes the first item and excludes the second item.

* * * * *